(12) United States Patent
Harboe

(10) Patent No.: US 7,367,681 B2
(45) Date of Patent: May 6, 2008

(54) METHOD AND DEVICE FOR COMBINING IMAGES FROM AT LEAST TWO LIGHT PROJECTORS

(75) Inventor: Øyvind Harboe, Stavanger (NO)

(73) Assignee: Cyviz AS, Sandnes (NO)

( * ) Notice: Subject to any disclaimer, the term of this patent is extended or adjusted under 35 U.S.C. 154(b) by 0 days.

(21) Appl. No.: 10/560,531

(22) PCT Filed: Jun. 11, 2004

(86) PCT No.: PCT/NO2004/000174

§ 371 (c)(1),
(2), (4) Date: Dec. 13, 2005

(87) PCT Pub. No.: WO2004/112402

PCT Pub. Date: Dec. 23, 2004

(65) Prior Publication Data

US 2006/0146295 A1 Jul. 6, 2006

Related U.S. Application Data

(63) Continuation-in-part of application No. 10/460,669, filed on Jun. 13, 2003, now abandoned.

(30) Foreign Application Priority Data

Jun. 13, 2003 (NO) .................................. 20032692

(51) Int. Cl.
*G03B 21/26* (2006.01)
*G03B 21/14* (2006.01)

(52) U.S. Cl. .......................... 353/94; 353/69; 348/745; 348/383

(58) Field of Classification Search .................. 353/29, 353/30, 34, 48, 69, 94, 121, 51, 28; 348/177, 348/745, 750, 758, 383
See application file for complete search history.

(56) References Cited

U.S. PATENT DOCUMENTS

| 4,974,073 | A | 11/1990 | Inova |
| 5,136,390 | A | 8/1992 | Inova et al. |
| 6,115,022 | A | 9/2000 | Mayer, III et al. |

(Continued)

FOREIGN PATENT DOCUMENTS

CA 2025624 3/1992

(Continued)

OTHER PUBLICATIONS

Majumder, A., et al., "Achieving Color Uniformity Across Multi-Projector Displays", Proceedings Visualization 2000, Oct. 8, 2000, pp. 117-124, XP010524593, IEEE.

*Primary Examiner*—Andrew T. Sever
(74) *Attorney, Agent, or Firm*—Rothwell, Figg, Ernst & Manbeck, PC

(57) ABSTRACT

Method and device for combining images from at least two light projectors, the images having a transition zone between them, wherein the dimensions of the transition zone is known, and the emitted light toward the transition zone from each projector is based on a predetermined transfer function from input signal to projected image for each projector in the transition zone, so as to obtain predictable image characteristics in the transition zone.

14 Claims, 3 Drawing Sheets

U.S. PATENT DOCUMENTS

| | | |
|---|---|---|
| 6,222,593 B1 | 4/2001 | Higurashi et al. |
| 6,456,339 B1 | 9/2002 | Surati et al. |
| 6,483,537 B1 | 11/2002 | Mayer, III et al. |
| 6,561,651 B1 | 5/2003 | Kubota et al. |
| 6,717,625 B1 * | 4/2004 | Thielemans ............... 348/745 |
| 2002/0024640 A1 * | 2/2002 | Ioka ........................ 353/94 |
| 2002/0027608 A1 | 3/2002 | Johnson et al. |
| 2002/0041364 A1 | 4/2002 | Ioka |
| 2002/0057361 A1 | 5/2002 | Mayer, III et al. |
| 2003/0067587 A1 | 4/2003 | Yamasaki et al. |
| 2003/0219085 A1 | 11/2003 | Endres et al. |

FOREIGN PATENT DOCUMENTS

| | | |
|---|---|---|
| EP | 0 473 820 A1 | 3/1992 |
| EP | 0 556 304 B1 | 8/1993 |
| EP | 1 034 663 B1 | 9/2000 |
| WO | WO 92/08319 A1 | 5/1992 |
| WO | WO 00/55687 A1 | 9/2000 |
| WO | WO 02/19704 A2 | 3/2002 |

* cited by examiner

METHOD AND DEVICE FOR COMBINING IMAGES FROM AT LEAST TWO LIGHT PROJECTORS

CROSS REFERENCE TO RELATED APPLICATION

This application is a 35 U.S.C. § 371 National Phase Entry Application from PCT/NO2004/000174, filed Jun. 11, 2004, which is a Continuation-in-part of U.S. application Ser. No. 10/460,669 filed on Jun. 13, 2003 now abandoned.

The invention is used to accurately and efficiently calculate the contribution from each light source when combining multiple light sources to give the same light intensity and colour as if a single light source was used.

This can for instance be used to create a smooth transition between the projected images between two or more projectors. In the overlapping area the projectors must be combined to create the same intensity and colour as if a single projector was used.

The use of multiple projectors has been known for a long time. In slide shows more or less overlapping images has been used to provide different visual effects. For these purposes different types of masks have been used to provide the transition between the images. These masks may be sharp edges or define smooth, gradual transitions. By adjusting the masks and the projectors, seamless transitions between adjacent or overlapping images are provided.

Using video projectors a similar solution is provided in Canadian patent CA 2,025,624 and U.S. Pat. No. 5,136,390, in which the masks are applied electronically. This has, however the disadvantage that the quality of the transitions are dependent on the projectors, as the projectors' response to input data varies to a large degree between different projectors and with the projector age.

U.S. Pat. No. 6,115,022 describes a related method in which selected parts of the overlapping areas of the images are monitored, both regarding colour and intensity, in real time so as to secure the image quality in the selected parts. This represents an improvement over the previous solutions but requires more processing while displaying the images and is dependant on selecting relevant parts of the overlapping area.

It is thus an object of this invention to provide a smooth transition between projected images with built in compensation for colour and intensity variations between the projectors. This is obtained by a method and a device being characterised as described in the independent claims.

The invention is thus based on the fact that the intensity and colour in each point of the overlapping area is known through the transfer function, and that the characteristics of each projector is measured. The input to each projector is then adjusted so that the sum of the light from all the projectors aimed at a point is equal to the transfer function at this point using red, green and blue, as well as the blending factor deciding the percentage of the total intensity at each point each projector should provide. In practice these data for each projector is provided as an interpolated, tabulated function.

The present invention will be explained more in detail below with reference to the accompanying drawings, illustrating the invention by way of example.

A projector usually projects 3-4 colour components (red, green, blue and white/clear) for each pixel. Each combination of pixel and colour component can be considered as independent light sources and should be treated separately.

A light source has a TF (transfer function), i.e. given an input you get a certain colour and intensity. The TF function can be calculated or measured. The TF might also have other parameters that should be taken into account, e.g. brightness/contrast adjustment capability on a projector. As mentioned above there are individual differences in the TF between projectors e.g. depending on deterioration with age, differences in A/D converters and lamp types.

Figure 1:
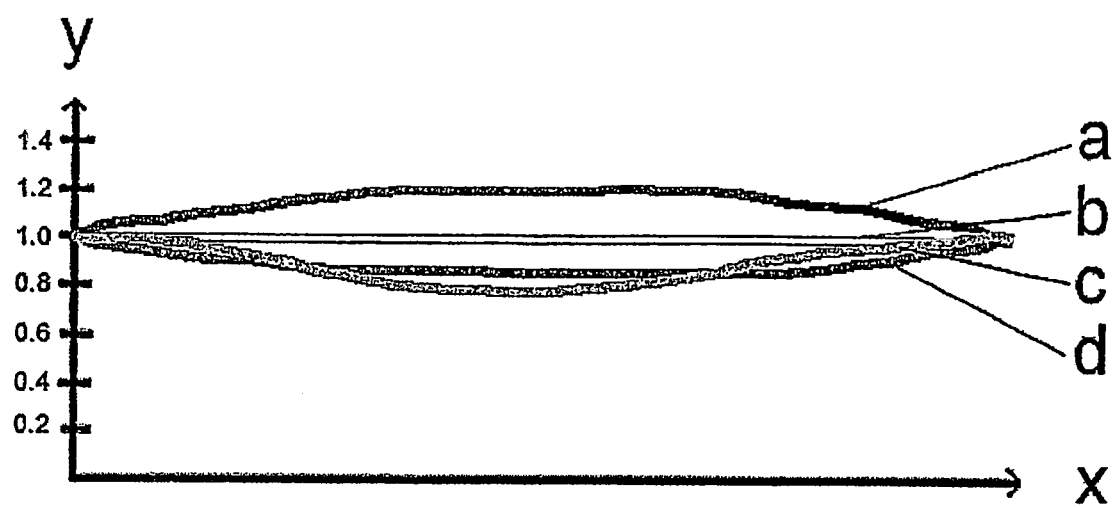
FIG. 1 illustrates errors in intensity using empirical approximations of the light intensity in the transition area between two projectors.

Existing methods for combining light sources to give the same colour and intensity usually has the weakness in that they do not take into account the intensity transfer function, but they create an empirical transition. FIG. 1 illustrates the problems related to this solutions, where x is the position in the edge blending transition between two images, and y is the expected intensity divided by actual intensity. As is evident from the drawing several errors may occur. In this example a dark colour a is too bright in the transition area, while two brighter colours c, d is too dark in the transition area, even though the empirical approximation was adjusted to a typical colour and the intensity b is flat as expected.

Figure 2:
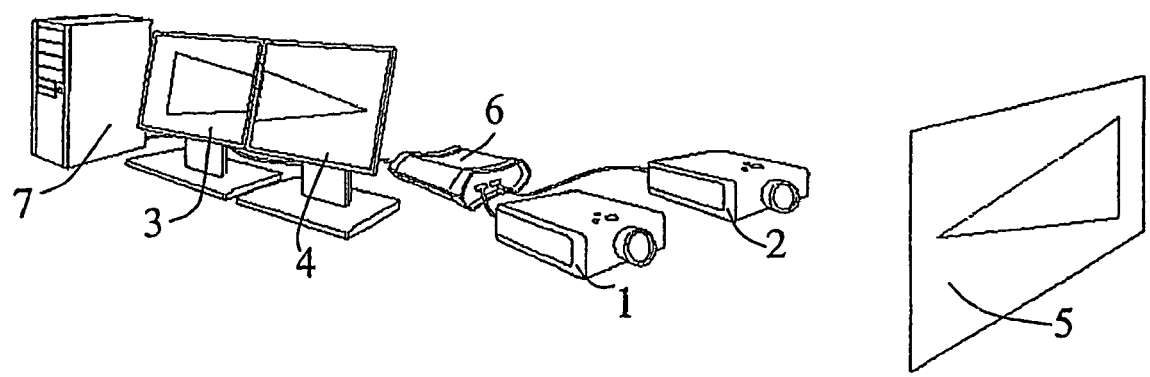
FIG. 2 illustrates the mixing of light from two sources.

Example: Referring to FIG. 2 two at least partially overlapping video projectors 1,2 are used for obtaining a combined image 5 from two separate images image 3,4 shown on separate screens. The system shown in FIG. 2 comprises a computer or similar storing and controlling the two images 3,4 which are to be combined, and a control unit 6 controlling the projectors 1,2 based on the stored characteristics of each projector. The control unit may comprise per se known means for analysing the projector characteristics, e.g. during start-up, or for receiving such information, e.g. from the computer 7.

Figure 4:
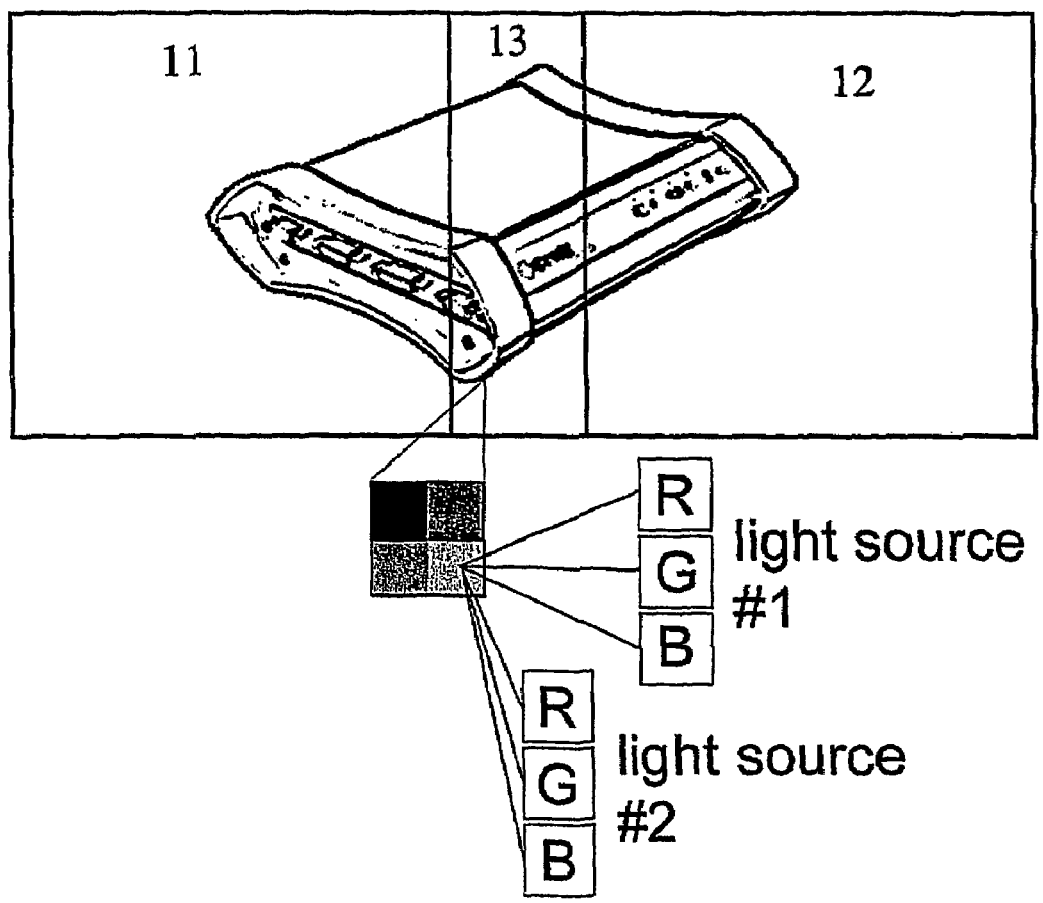
FIG. 4 illustrates two projectors projecting two partially overlapping images on a screen.

Referring to FIG. 4 the combined image 11,12 have a transition zone 13 where each point is represented by both projectors with chosen intensity and colour. A preferred method will usually be to transition in the overlapping area from one dominating projector to another dominating projector, thus to provide a gradual transition between the two. Each point in the transition zone may be viewed as the mixing of two light sources, two light sources are combined as follows:

$$i_{lightsource1} = \beta * i_{original}$$

$$i_{lightsource2} = (1-\beta) * i_{original}$$

$i_{lightsource1/2}$ input to the light sources $i_{original}$ original input to the light source before the transition $\beta$, $1-\beta$—mixing relationship, sums to 1 for all light sources involved (two in this case). Normally $\beta$ is chosen as x/(width−1), where x is position in overlap (starting at 0) and width is the width of the overlap in pixels.

The weakness of this method is that it will not give an even light intensity and colour if the TF is not linear and monochromatic. In these cases it is common to create an empirical adjustment, e.g.

$$i_{lightsource1} = 1^{(t/T)/\gamma} * i_{original}$$

The formula is as above, but with a parameter ($\gamma$) that is tweaked to get the best possible visual result. This may work reasonably well for a specific value of $i_{original}$, but the resulting intensity can be too high or low for other input values (See FIG. 1). The result is further worsened when the light source does not have a monochromatic TF.

In prior art, it is a common assumption that each input controls each output colour indepdentently. In this case the projector can be treated as an intensity transfer function (ITF) for each input. This is clearly wrong where a projector has red, green, blue inputs and red, green, blue and white/clear output, but it can also be a wrong assumption for projectors that have red, green and blue input/outputs depending on the TF.

Creating edge blending effects when a projector has an ITF is much simpler than when it has a TF and unless the complications caused by the TF are treated explicitly, it must be assumed that prior art refers to the simpler case of projectors only having an ITF.

The present invention does not exhibit the abovementioned weaknesses as it takes into account the TF (FIG. 1). For the case above, we have:

$$i_{lightsource1}=TF_1^{-1}(TF_1(i_{original})*\beta)$$

$$i_{lightsource2}=TF_2^{-1}(TF_2(i_{original})*(1-\beta))$$

Figure 3:
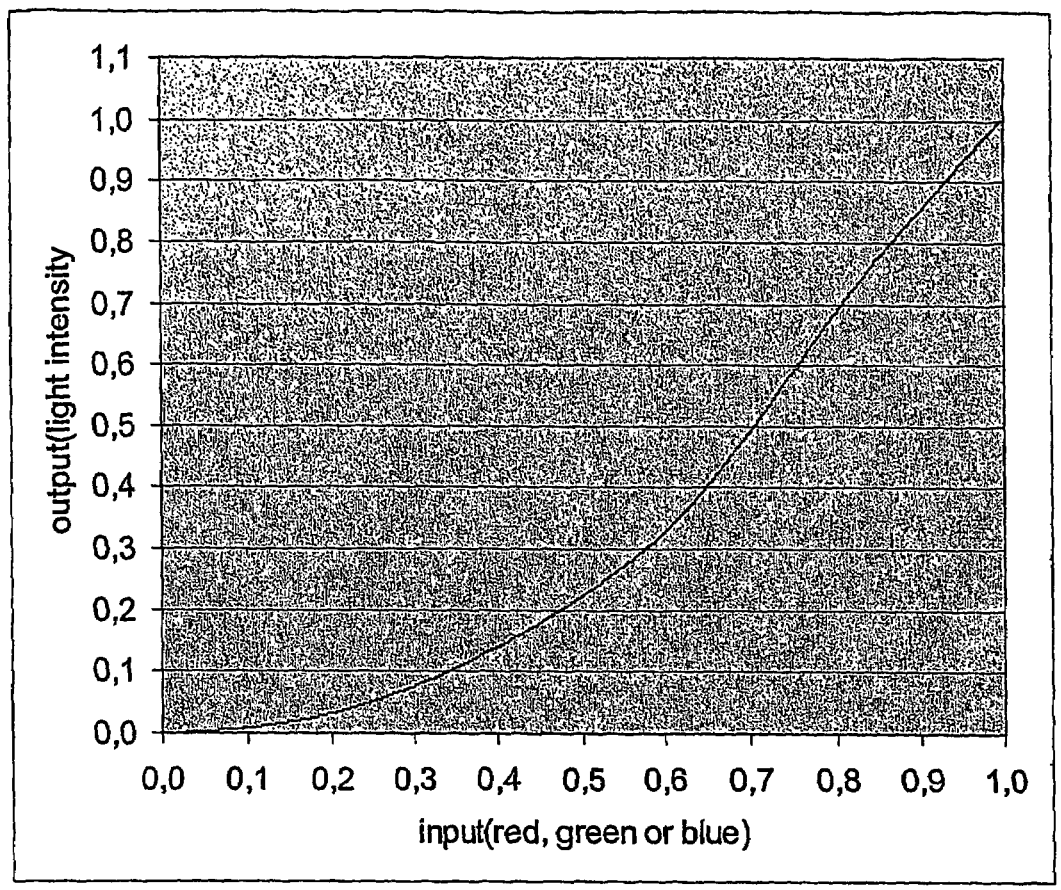
FIG. 3 illustrates the transfer function of a light source.

$i_{lightsource1/2}$ input to the light sources $i_{original}$ original input to the light sources β—as above $TF_n(x)$ is the transfer function, as illustrated by FIG. 3, which evaluates to light intensity and colour for each light source, in this case for an F1 projector from projectiondesign.com.(Photographic mode). Normally the TF is monochromatic, i.e. only the intensity and not the colour changes in response to the input. If the colour as well as intensity changes based upon input, $TF_n(x)$ is not a scalar but a vector, normally of size 3. The size of the vector owes its heritage to the eyes ability to distinguish three colours. Ref: tristimulus CIE XYZ in "Computer Graphics—Principles and practice" by Foley, van Dam, Feiner and Hughes, published by Addison Wesley Publishing Company, ISBN 0-201-12110-7.

$TF_n(x)$ is of arbitrary units such that $TF_n(x)=\beta TF_n(x)+(1-\beta)TF_n(x)$, $\beta \in [0, 1]$.

Multiple light sources can be combined and together have a single TF, e.g. projectors with red, green, blue and white components have a single TF(RGB)=XYZ $TF_n^{-1}(x)$—mathematical inverse of $TF_n(x)$. Sometimes $TF_n^{-1}(x)$ is not defined for values of x, in which case an approximation can be good enough for practical purposes.

If the TF is slightly different for each light source, there will be a smooth transition from the colour and intensity in one source to the colour and intensity in the other light source.

This invention purposly does not try to compensate for variations in the TF (e.g. lamp colour, spatial colour/intensity variations). The problem with trying to compensate for differences in the TF is that projectors generally have a limited dynamic range in its inputs (typically 256 levels), and any attempts at compensating for differences in TF invariably end up reducing the dynamic range, which rapidly causes disturbing effects. A much better approach is to take advantage of the human eyes tendency to ignore differences in colour and intensity that varies only slightly per angle. A typical example of where projectors take advantage of this approach today is for light intensity. The light intensity for a projector in its corners is typically 75% of its maximum(in the center), yet it is perceived by most people as uniform intensity.

In FIGS. 2 and 4 an embodiment of the invention is illustrated in which two projectors 1,2 are used to create a smooth transition 13 between two projectors edge blending. Referring to FIG. 1, FIG. 4 shows how a single projected pixel in the overlapping area consists of six independent light sources, red, green, blue from projector 1 and 2 respectively. In this case the projectors have the following features:

Independently controllable colour components, i.e. it can have a white component as long as it is independently controllable. For a projector the white component is not normally independently controllable from the outside and the invention would have to be embedded into the projector.

the TF varies only in intensity.

Each combination of colour component and pixel can in this case be treated separately and in the same manner. Only the light intensity changes in response to the input, hence the transfer functions are actually intensity transfer functions and can be written as:

$$ITF_{red/green/blue}(i_{red/green/blue})=\text{intensity}$$

Where $i_{red/green/blue}$—red, green or blue input value (typically between 0 . . . 255)

intensity—a scalar value between 0 . . . 1 when multiplied by $I_{colormax}$ gives actual colour and intensity $ITF_{red/green/blue}(i_{red/green/blue})$—measured or as in the case of FIG. 1 given by manufacturer in tabularized form $I_{colormax}$—colour vector for maximum light intensity for colour component For edge blending we also need to know $ITF_1^{-1}$(intensity). $ITF_1^{-1}$(intensity) can be calculated, e.g. using a binary search algorithm on ITF( ), and tabulated.

For a single colour component the input to the projectors to blend a single colour component is calculated as follows:

$$i_{projector}=ITF^{-1}(ITF(i_{original})*\beta)$$

$i_{projector}$ edge blended color input to the projector $i_{original}$ the input to the projector to show the desired pixel when no edge blending in use β—mixing factor. β for one projector and (1−β) for the second. Transitions from 0 to 1 in the overlapping area.

Since the edge blending takes place in real time, a practical implementation must be very fast. With a projected resolution of 1280×1024 pixels×60 Hz, this can be implemented using a modern FPGA (e.g. the Xilinx Virtex-II family). In one embodiment of the invention the following parameters outlines how this was implemented:

ITF and $ITF^{-1}$ were implemented as tables with sufficient precision and size to ensure that $c \approx ITF^{-1}(ITF(c))$ Interpolation to improve accuracy of $ITF^{-1}$ ITF implemented as a table lookup. 256 entry table of 16 bit integer.

$ITF^{-1}$ implemented as a table lookup. 512 entry table of 8 bit integers $ITF(i_{original})*\beta$ implemented as (16 bits*9 bits integer multiplication)/256

β was decremented from 256 to 0 in the overlap range using mid-section line drawing algorithm If the projectors have red, green, blue and white components, the discussion above still applies, with the exception that there are various complications related to the TF( ) of the two identical projectors. The inputs to these projectors are still red, green and blue. Although each of the red, green, blue and white segments have separate independent TF, they are not separately controllable. The combined TF for all the combined colour components is:

$$TF(RGB)=XYZ$$

RGB—colour input vector to projector
XYZ—response vector. For practical purposes XYZ are normalized to be in the range [0 . . . 1, 0 . . . 1, 0 . . . 1]

TF(RGB) is in this embodiment either given by manufacturer or measured. This can for instance be done by measuring a large number of samples in the RGB cube and interpolating the rest of the values. E.g. 64×64×64 samples when measured 1 sample/second would take ~3 days. With a fast measurement device, e.g. 20 samples a second, it is quite feasible to measure the full range of colours for a projector with 256×256×256 RGB combinations (~10 days). Normally the TF(RGB) is trivially calculated and hence it is preferable to deduce the function or have it provided by the manufacturer.

In this case it is non-trivial to find $TF^{-1}(XYZ)$ and in some cases it might not even exist, in which case an approximation might be good enough for practical purposes. One method is to use a downhill simplex simulated annealing optimization algorithm, e.g. as described in "Numerical Recipies in C++ Second Edition", by William H. Press, Saul A. Teukolsky, William T. Vetterling and Brian P. Flannery, published by Cambridge University Press, ISBN 0 521 75033 4), i.e. find RGB such that the expression below is as close to 0 as possible:

$$|TF(r,g,b)-XYZ|$$

The RGB value to input to the projector to do the blending is then calculated as follows:

$$RGB_{blendedpixel}(RGB_{original}, \beta)=TF^{-1}(TF(RGB_{original})*\beta)$$

The formula above is not practical to implement in hardware. An alternative is to tabulate the resulted blended colours of the formula above and then interpolating the resulting blended pixel. Although TF can normally be calculated efficiently with great accuracy, the same is not the case with $TF^{-1}$. To be calcualted quickly enough for edge blending purposes, it would have to be implemented as a multidimensional stored table. Since the size of a complete tabulation of $TF^{-1}$ is impractical (2003, too large), some means of interpolation will have to be used. Multidimensional interpolation is known to be problematic, and it will give especially poor results on $TF^{-1}$ due to $TF^{-1}$ shape. Typically these interpolation problems manifest themselves as moire like artifacts in the transition between two projectors.

A much better approach is to interpolate $RGB_{blendedpixel}$ ($RGB_{original}$, $\beta$) as the shape of this function is much better suited for initerpolation. During tabulation of $RGB_{blendedpixel}(RGB_{original}, \beta)$, $TF^{-1}$ is not approximated but calculated accurately using e.g. downhill simplex simulated annealing optimisation algorithm mentioned above. This procedure is computationally expensive, hence it should be calculated ahead of time. If the TF changes (as would happen when e.g. adjusting the "colour temperature" or gamma curve in a projector), some time will pass before $RGB_{blendedpixel}(RGB_{original}, \beta)$ can be retabulated.

In one embodiment a four dimensional table (3×3×3×16, RGBβ) was created for $RGB_{blendedpixel}(RGB_{original}, \beta)$ and linear interpolation was used. The size of the table is a compromise between hardware requirements and quality required.

It is practical to implement this blending in hardware using a modern FPGA (2003).

One practical aspect of video signals and the TF is signal transmission technology, e.g. an analogue VGA signal is sampled to a digital signal or transmitted digitally using a DVI cable. With a DVI cable, there is no signal loss, but the cable length and bandwidth is more limited than for a VGA cable. If multiple VGA sources are combined as above to a single picture, the errors introduced during the conversion from analogue to digital data can have a substantial negative impact (cable length, slight calibration differences, etc.). Normally it is possible to adjust the A/D conversion to set the 0 level and the dynamic range, frequently described as adjusting brightness (0 level) and contrast (dynamic range). In one embodiment of the solution, a known test image was displayed and the sampled pixel was compared, and based upon this the contrast and brightness for the A/D conversion was automatically adjusted. The reason why the AID conversion is as critical as when combining multiple images as above is that the TF is very steep, i.e. a small offset/dynamic range error has a large impact on the displayed colour and intensity. The invention therefore also relates to an automatic adjustment method of analogue to digital input video signal conversion using a known input signal and comparing with a resulting digital video signal. This may be obtained by adjusting the zero offset and dynamic range automatically according the result of the comparison.

To summarise; the invention relates to a method for combining images from at least two light projectors, the images having a transition zone between them, wherein the dimensions of the transition zone is known, and the emitted light toward the transition zone from each projector is based on a predetermined transfer function from input signal to projected image for each projector in the transition zone, so as to obtain predictable image characteristics in the transition zone.

The transition zone may be, as illustrated in FIG. 2, the overlapping parts of two adjacent images. It is, however, clear that the transition zone may be of different types and shapes, e.g. if an image from one projector is surrounded by the image from another projector.

As stated above the method according to the invention may comprise the step of interpolating between the light characteristics of a first projector to the light characteristics of a second projector over the image transition zone area, so as to provide a smooth transition between the projected images. In most cases the transition zone is the same as the overlapping part of the images, but other situations may be contemplated, e.g. in the transition between adjacent, non-overlapping images. This may apply if there are large differences between two projectors and the interpolation requires a smoother transition than available in a small overlapping area. This is of course limited by the available variations in the projectors intensity and colour room.

Also as stated above the transfer function may be calculated from known characteristics of the projector or measured by providing a known signal to the projector, measuring the emitted light and calculating the transfer function from the measured relationship between applied signal and measured light characteristics. The applied signal may be a ramp from zero output intensity to full output intensity of the projector, a process which maybe performed as an automatic part of the start up procedure of the system and projectors.

The control device according to the invention for at least two image projectors being adapted to project overlapping images at a surface and defining a transition zone between the images from each projector, the device comprising memory means for storing a transfer function for each projector, said transfer function describing the relationship between input signal and emitted light of each projector, and calculating means for applying said transfer functions on said input signal so as to obtain a predictable image characteristics in the transition zone between the at least two projected images.

The invention claimed is:

1. A method for calculating input signals to at least two light projectors for spreading fluctuations in color intensity over an area, thereby creating a substantially invisible transition zone between them, said method comprising:

calculating input signals to each of the at least two light projectors for a projected image in a predetermined transition zone based on a blending function that controls emitted light directed toward said predetermined transition zone from each of at least two light projectors;

wherein the input signals to at least two light projectors are provided from tabulating said blending function using red light, green light, blue light and a blending factor to produce a tabulated blending function, wherein said blending function for each of at least two light projectors at each point within said transition zone provides a sum constituting a transfer function in the point, so as to obtain predictable projected image characteristics in the transition zone, and wherein said tabulated blending function is calculated from a downhill optimization algorithm, and wherein the projected image at each point in said transition zone is constituted by the contribution from each of the at least two light projectors, and wherein the amount of the contribution from each of the at least two light projectors is determined by choosing said blending factor for each point.

2. The method according to claim 1, wherein the input signals to the at least two light projectors are provided by interpolating the blending function.

3. The method according to claim 1 wherein the blending function is only used ahead of time and not during an edge blending process when calculating input signals to said light projectors.

4. The method according to claim 1 wherein the blending function is obtained by measuring the relationship between input image data and emitted light characteristics.

5. The method according to claim 1, wherein the blending function is applied to input data to the at least two light projectors, thereby conditioning the data to obtain the required image characteristics.

6. The method according to claim 1, further comprising the step of interpolating between the light characteristics of at least a first light projector to the light characteristics of at least a second light projector over the image transition zone area, thereby providing a smooth transition between the projected images.

7. The method according to claim 1, wherein the blending function is determined by applying a known signal to the projector, measuring the emitted light characteristics and calculating said blending function from the measured relationship between the applied signal and measured light characteristics.

8. The method according to claim 7, wherein the applied signal is a ramp from zero output intensity to full output intensity of the projector.

9. The method according to claim 7, wherein the blending function is measured and calculated as an automatic part of the projector start up procedure.

10. A control device for at least two image projectors adapted to spread fluctuations in color intensity over an area of a surface, thereby creating a substantially invisible transition zone between them, the device comprising:

memory means for storing tabulated blending functions for each projector, wherein each blending function describes the relationship between an input signal and emitted light characteristics of each light projector, the sum of said tabulated blending functions describing the blending function, and control means for applying said tabulated blending functions on said input signal to each light projector so as to obtain predictable image characteristics in the transition zone between the at least two projected images wherein the input signals to at least two light projectors are provided from tabulating said blending function using red light, green light, blue components and a blending factor to produce a tabulated blending function, wherein said blending function for each of at least two light projectors at each point within said transition zone provides a sum constituting a transfer function in the point, so as to obtain predictable projected image characteristics in the transition zone, and wherein said tabulated blending function is calculated from a downhill optimization algorithm.

11. A method of controlling emitted light directed toward a predetermined transition zone from each of at least two light projectors for spreading fluctuations in color intensity over an area, thereby creating a substantially invisible transition zone between them, said method comprising:

(a) providing an equation of formula (I)

$$RBG_{blendpixel}(RBG_{original},\beta)=TF^{-1}(TF(RBG_{original})*\beta) \quad (I)$$

(b) determining the blending function by tabulating the resulting blended pixel colors of formula (I), (c) interpolating the blending function for non-tabulated blended pixel colors, (d) providing at least two light projectors for forming a projected image wherein light emitted from the at least two light projectors is controlled by the blending function as determined in steps (b) and (c), and (e) emitting light from the at least two light projectors controlled by the blending function as determined in steps (b) and (c) in a manner that spreads fluctuations in color intensity over an area to create a substantially invisible transition zone between the at least two light projectors, and wherein said determining of the blending function of step (b) is tabulated by using a downhill optimization algorithm.

12. A method according to claim 11 wherein interpolating the resulting blended pixel is accomplished by an optimization algorithm.

13. A method according to claim 12 wherein the optimization algorithm is a simulated annealing optimization algorithm.

14. A method according to claim 13, wherein the optimization algorithm is a downhill simplex simulated annealing optimization algorithm.

* * * * *